United States Patent
Mönch

(10) Patent No.: US 7,503,656 B2
(45) Date of Patent: Mar. 17, 2009

(54) PROJECTION DEVICE FOR SIMULTANEOUSLY GENERATING A PLURALITY OF MUTUALLY SPACED, HOLOGRAPHIC FRAMES OF ONE AND THE SAME IMAGE BY MEANS OF A HOLOGRAPHIC SCREEN

(75) Inventor: Holger Mönch, Vaals (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 306 days.

(21) Appl. No.: 10/555,252

(22) PCT Filed: Apr. 29, 2004

(86) PCT No.: PCT/IB2004/001295

§ 371 (c)(1),
(2), (4) Date: Jul. 6, 2006

(87) PCT Pub. No.: WO2004/099852

PCT Pub. Date: Nov. 18, 2004

(65) Prior Publication Data

US 2006/0274271 A1    Dec. 7, 2006

(30) Foreign Application Priority Data

May 6, 2003   (EP)   ................... 03101248

(51) Int. Cl.
G03B 21/14   (2006.01)
G02B 27/22   (2006.01)

(52) U.S. Cl. ............................. 353/7; 359/23; 359/458; 359/466

(58) Field of Classification Search .................... 353/7, 353/10, 121, 122; 359/15, 23, 24, 458, 464, 359/466, 472
See application file for complete search history.

(56) References Cited

U.S. PATENT DOCUMENTS 4,799,739 A * 1/1989 Newswanger ................ 359/15
5,046,793 A   9/1991 Hockley et al.
5,291,316 A   3/1994 Haberman et al.

(Continued)

FOREIGN PATENT DOCUMENTS

DE    10200134 A1   8/2002

(Continued)

Primary Examiner—William C Dowling

(57) ABSTRACT

A projection system includes an image projection apparatus window and a transparent holographic screen deflecting light from the image projection apparatus into discrete, mutually spaced directions so that an area which is free from images is formed between identical images. Projected, mutually spaced holographic frames of the image is visualized by the holographic screen that includes a film layer which is partially illuminated multiple times at different pick-up angles to the same object of an image, so that the film layer has hologram images of the same object at mutually different pick-up angles. The transparent screen may include many holographic film layers, in which each film layer is illuminated once at different pick-up angles to the same object, so that each film layer has one hologram image of the object at a different pick-up angle.

9 Claims, 1 Drawing Sheet

U.S. PATENT DOCUMENTS

Figure 1:
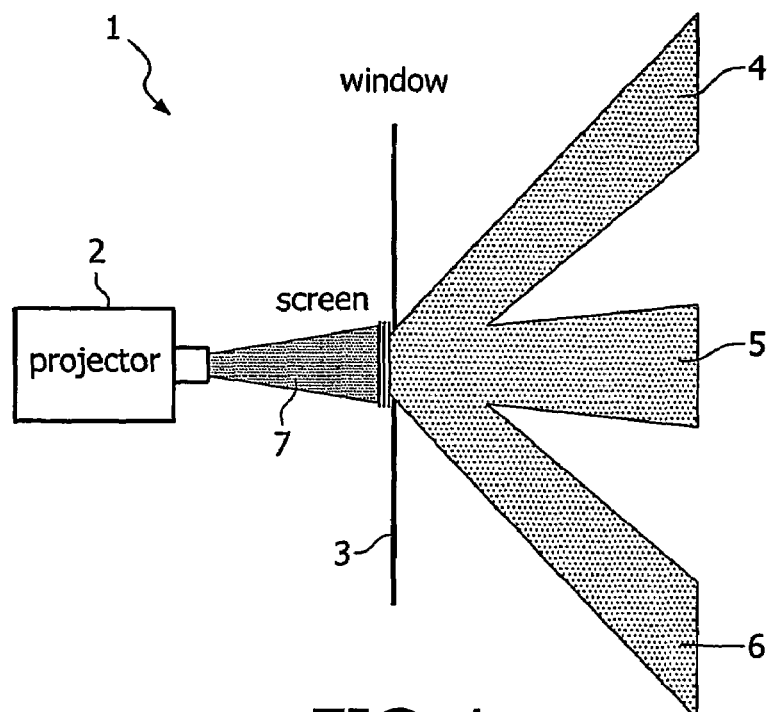

| | | | |
|---|---|---|---|
| 5,999,281 A * | 12/1999 | Abbott et al. | 359/15 |
| 6,095,652 A | 8/2000 | Trayner et al. | |
| 6,101,007 A * | 8/2000 | Yamasaki et al. | 359/15 |
| 6,175,431 B1 | 1/2001 | Woldern et al. | |
| 6,191,876 B1 * | 2/2001 | Popovich | 359/15 |
| 6,414,727 B1 | 7/2002 | Benton | |
| 6,665,100 B1 * | 12/2003 | Klug et al. | 359/23 |
| 6,721,075 B2 * | 4/2004 | Orr et al. | 359/23 |

FOREIGN PATENT DOCUMENTS

| | | |
|---|---|---|
| EP | 0463888 A2 | 1/1992 |
| WO | 0169349 A2 | 9/2001 |
| WO | 2004099852 A1 | 11/2004 |

\* cited by examiner

PROJECTION DEVICE FOR SIMULTANEOUSLY GENERATING A PLURALITY OF MUTUALLY SPACED, HOLOGRAPHIC FRAMES OF ONE AND THE SAME IMAGE BY MEANS OF A HOLOGRAPHIC SCREEN

The invention relates to a projection device for simultaneously generating a plurality of mutually spaced, discrete, holographic frames of one and the same image by means of a holographic screen, a projection system comprising a projection device and a plurality of mutually spaced, discrete, holographic frames of one and the same image, visible to a viewer, as well as their use for visualizing images and/or data, particularly commercials.

The necessity of visualizing images and data, particularly for information and commercial purposes is clearly increasing these days. For the display technique, this opens a market with many segments, a large turnover and high growth rates. In the last few years, great progress has been made in the functional chain of picking up, transmitting and processing images and data for purposes of information. To represent data and images, displays such as cathode ray tubes and liquid crystal displays are widely used.

Basically, an image can be generated on the display screen in two ways with all projectors, namely by means of front projection or by means of rear projection. In the first-mentioned case, the image is projected onto the face of the screen on which it is also viewed. In this case, the screen should maximally scatter the incident light diffusely backwards. In the last-mentioned case, the image is projected on the opposite side of the screen (from the rear). The screen should then maximally transmit the light but simultaneously scatter it forwards through a relatively large angle.

There is a great need of data and image projection systems which provide the possibility of multiple display of the same data and images of the same object at different locations so as to reach a plurality of spatially separated viewers and/or repeatedly reach the same viewer.

In the prior art, an image/data projection system is used for each individual frame for simultaneous and multiple, locally spaced display of the same data and/or images.

For example, DE 102 00 134 discloses a hologram display screen for displaying an image by diffracting and scattering light projected by an image projection apparatus. A light-scattering device for scattering the light upwards/downwards, which light is incident from at least one upward/downward-specified angular range and is widened obliquely upwards or obliquely downwards, is arranged on the side of the image projection apparatus of a hologram device in the hologram display screen, and a light-scattering device for scattering the light to the left or right, which light is incident from a left/right-specific angular range and is widened obliquely to the left and obliquely to the right, is arranged between the hologram device and the upward/downward light-scattering device or the side of the image projection apparatus of the upward/downward light-scattering device. The construction is implemented in such a way that the upward/downward-specific angular range encloses or comprises the angle of incidence of the image light on the hologram display screen and thus provides a hologram display screen having a satisfactory color-reproducing capability, which also allows viewing of a background.

It is an object of the invention to provide a projection device for simultaneously generating a plurality of mutually spaced, discrete, holographic frames of one and the same image by means of a holographic screen.

It is a further object of the invention to provide a projection system comprising a projection device and a plurality of mutually spaced, non-overlapping frames, visible to a viewer, of one and the same image by means of a holographic screen.

An advantageous embodiment relates to a projection system comprising
  at least one image projection apparatus,
  at least one transparent screen deflecting the light from the image projection apparatus into a plurality of discrete, mutually spaced directions so that an area which is free from images is formed between identical images, and
  a plurality of projected, mutually spaced holographic frames of at least one image visualized by means of the holographic screen, wherein the transparent screen comprises at least one film layer which is partially illuminated multiple times at different pick-up angles to the same object of an image, so that the film layer has a plurality of hologram images of the same object at mutually different pick-up angles, and/or the transparent screen comprises a plurality of holographic film layers, in which each film layer is illuminated once at different pick-up angles to the same object, so that each film layer has one hologram image of the object at a different pick-up angle.

The formulation "of the same object", as used in the present invention, also encompasses "the identical object".

In accordance with an embodiment of the invention, the screen deflects the light from the projector into a plurality of discrete, mutually spaced directions, wherein an area without images is formed between identical images, such that each time only one of these images can be observed by a viewer by changing his position and/or the viewing angle.

According to the invention, it is preferred that the viewer simultaneously sees not more than one of the images of the same object.

Since the screen deflects the light from a projector into a plurality of discrete, mutually spaced directions, wherein an area without images is formed between identical images, the individual images appear to be brighter than in the case when the whole area between the first and the last image is filled up. The light intensity of these mutually spaced images, measured in $Cd/m^2$, is preferably a factor of 2 to 10 higher, preferably a factor of 3, further preferably a factor of 4 and still further preferably a factor of 5 as compared with a sequence of identical images in which no image-free area is formed between the images. When using a projector, the light intensity of each image is increased by the ratio between the illuminated areas and the non-illuminated areas.

The screen may be formed as a reflective layer and/or a transmissive layer.

The image projection device may be a laser projector. As compared with other projection methods, laser projectors have a very high primary contrast of 1:300 or more. Consequently, they provide a clearly better display in semi-dark spaces, as compared with conventional image projection apparatuses.

The invention relates both to rear projection and front projection as well as a combination thereof, i.e. partial rear projection and partial front projection.

Screens for rear projections with the conventional image projectors (beamers) are commercially available in different sizes and types and different projection screen materials.

A screen in the sense of the invention is based on at least one holographic film layer. In the simplest case, a screen consists of one holographic film layer. The screen may, however, also comprise a plurality of superimposed holographic film layers. One holographic film layer may also be designated as screen so that superimposed screens are concerned when a plurality of holographic film layers is used. The screen may often comprise a transparent support. In the simplest case, a holographic film layer may be arranged on a support. However, the holographic film layer may alternatively have at least one non-transparent layer, preferably a light-absorbing layer.

The transparent screen may comprise at least two, preferably at least three, further preferably at least four and still further preferably at least five holographic film layers.

The transparent screen preferably has one film layer which is partially illuminated multiple times at different pick-up angles to the same object so that the film layer comprises a plurality of hologram images of the same object at different pick-up angles. Due to this simultaneous implementation of the screen on the basis of a film layer that has been partially illuminated film layer multiple times, an image can be provided simultaneously for a plurality of viewing directions by means of the holographic transparent screen, for which a plurality of angular ranges, within which the mutually spaced images of the same object are visible, is available to the viewer. However, the intermediate angular ranges, i.e. the range between two adjacent images, are free from frames or images, i.e. in these ranges the screen appears transparent and/or dark to the viewer.

However, it is also possible to form a transparent screen on the basis of a plurality of holographic film layers, with each film layer being illuminated once at different angles to the same object so that each of these film layers comprises a hologram image of the object at a different pick-up angle. In this embodiment of the screen, a plurality of holographic film layers is superimposed by way of stacking.

In a preferred embodiment, a first film layer or screen is implemented in such a way that it deflects the projected light into the first viewing direction, and the second film layer or screen is implemented in such a way that it deflects the light into the second viewing direction. The first holographic film layer is chosen to be such that it reflects only a given percentage of the light and transmits the rest of the light so that subsequent holographic film layers also still reflect a part of the projected light.

The holographic film layers are preferably implemented in such a way that, when using a plurality of superimposed holographic film layers, each holographic film layer substantially reflects the same amount of light.

In a particularly preferred embodiment, the screen has three holographic film layers, each with different viewing directions. For example, the first holographic film layer of the screen deflects ⅓ of the projected light, the second holographic film layer of the screen deflects half of the light which is still present, i.e. ½*⅔=⅓, which results in the same amount of light, and the third holographic film layer of the screen deflects 100% of the light still remaining, i.e. the remaining one third. The three holographic film layers may be laminated together to form a screen.

Due to consecutive partial illuminations, such a screen can also be made with one holographic film layer.

However, it is alternatively possible to manufacture a screen which is laminated from at least one holographic film layer that has been partially illuminated multiple times and at least one holographic film layer that has been illuminated once.

The division of the amount of light into the different directions may be effected uniformly but of course also non-uniformly.

The holographic film layer may be illuminated in known manner, such that the projected, spaced images of the same object have an increasing or a decreasing luminance for the viewer, for example, through a certain trajectory.

In the sense of this invention, a "certain trajectory", is understood to be the shortest distance covered by a viewer who views the relevant image from the one to the next, adjacent image.

It is alternatively possible that the central viewing direction of an image generated by means of a holographic screen appears bright and the laterally adjacent viewing directions appear darker.

The images of the same object projected by means of a holographic screen may also be distinguished by their colors, for example, dependent on the viewing direction. Due to the wavelength sensitivity, particularly of what are referred to as "thick" holograms, color separation is very well possible. Consequently, the image contents or images of the same object may be different in their individual colors.

In a further preferred embodiment of the projection system, a plurality of first, mutually spaced holographic frames of the same first object can be projected simultaneously, and a plurality of second, mutually spaced holographic frames of the same second object can be projected simultaneously, wherein the first frames and the second frames are different images. For this purpose, an image projection apparatus or a separate light beam as well as a screen are required for each individual image to be projected.

For the simultaneous projection of a plurality of first, second and third, mutually spaced holographic images of a first, a second and a third object, at least three projection apparatuses or three separate light beams and at least three screens are thus required in accordance with the embodiments described hereinbefore.

It is preferred that the first, second and third objects are different from each other.

Not only a reflective screen but also a transmissive screen may be used according to the invention, as well as screens which are partially reflective and partially transmissive.

Screens which are partially reflective and partially transmissive have the advantage that viewers can view at least one of the simultaneously projected, spaced images of the same object in a spatially independent manner from substantially any direction, i.e. also circularly around the screen.

For example, a holographic screen used at three different angles also provides three viewing directions or angular ranges for the viewers. Dependent on the layout of the screen, the image virtually appears either behind and/or in front of the screen, for example, within the angular ranges of −50° to −30°, −10° to +10° and +30° to +50°. At the angles in between, no image appears to the viewer and the screen looks transparent and allows, for example, a view of a configuration of windows located behind it.

Moreover, it is advantageous that a holographic screen which is usable according to the invention allows the exit angle to be different from the angle of incidence of the light beam from the image projection apparatus. For example, in spite of a horizontal viewing direction, this allows the image projection apparatus to be mounted at a location which is independent of the actual exit angle, for example, at the upper or lower edge of a window. The vertical projection angle should only be dimensioned to be so large, for example −20° to +20°, that it still enables viewers of different lengths to view the image.

The hologram screen may be implemented as a transmissive hologram screen and/or a reflective hologram screen.

To manufacture the screens and the holographic film layer or film layers, substantially any method known in the state of the art is usable.

For example, a hologram or screen may be manufactured by illuminating a photosensitive film layer by means of an optical illumination system. Conventionally, a laser beam is generated, for example, by a laser oscillator and divided into two beams by means of a beam splitter so as to generate sub-beams. The sub-beam is deflected by reflectors and an objective lens, and this deflected beam is directed as a reference beam obliquely from a higher position onto a photosensitive film layer. The other sub-beam is deflected by a reflector and an objective lens, and this sub-beam is directed as an object beam onto a photosensitive film layer by means of a light diffuser. As a result, the reference beam and the object beam interfere with each other, namely on the photosensitive film layer, so that a hologram is then formed. A screen is manufactured by using this holographic film layer.

The hologram screen or the screen may also be manufactured in such a way that the hologram is imaged on a density modulation plate, for example, a density modulation plate of the trademark name OmmniDex®, marketed by the firm of Dupont. Also in this case, a hologram display screen having excellent color reproducibility and enabling the viewer to view the background can be manufactured.

The hologram screen or the screen may, however, also be constructed from a computer hologram. To generate a computer hologram, the screen is segmented into microscopic units of several tens of micrometers and the diffraction wavelength, the diffraction direction, the focusing position, etc. are adjusted. The required diffraction grating will subsequently be computed and processed by means of a computer.

As already described hereinbefore, a screen may comprise one holographic film layer or a plurality of holographic film layers that have been partially illuminated multiple times, in which each film layer images the same object at a different angle of illumination.

To manufacture the screens which are usable according to the invention, it is preferred that the pick-up angles of the object differ by at least ±1% and maximally ±60%, particularly at least ±5%, preferably at least ±10%, further preferably at least ±15%, and still further preferably at least ±20% for generating mutually spaced holographic frames of an image of one and the same object by means of a holographic screen. The pick-up angles of the object for generating mutually spaced holographic frames of an image of the same object by means of a holographic screen may also differ by at least ±25%, particularly at least ±30%, preferably at least ±35%, further preferably at least ±40%, and still further preferably at least ±50%.

Due to the changed pick-up angles with respect to the same object, a plurality of mutually spaced holographic images of an object can be simultaneously visualized to a viewer within a viewing angle range with respect to the screen of at least ±1% and maximally ±60%, particularly at least ±5%, preferably at least ±10%, further preferably at least ±15% and still further preferably at least ±20%. The viewing angle range with respect to the screen may also be at least ±25%, particularly at least ±30%, preferably at least ±35%, further preferably at least ±40% and still further preferably at least ±50%.

The pickup angle for the frames of one and the same image by means of a holographic screen should be preferably selected in such a way that the mutually spaced, discrete images of an object picked up at different angles and visualized to a viewer by means of projection on a holographic reflective layer and/or transmissive layer do not overlap.

For the case where the images visualized to the viewer do not overlap, the screen looks transparent to the viewer in the angular ranges between adjacent frames.

In accordance with a preferred embodiment of the projection system, the visualized, spaced discrete images of the same object may exhibit color and/or luminance differences to the viewer.

On viewing otherwise identical images, the viewer's attention can be increased by these color and/or luminance differences.

The visualized, mutually spaced discrete images of the same object may also be different to the viewer as far as height, width and horizontal arrangement and/or vertical arrangement are concerned.

Changes as regards chrominance, luminance, height, width, horizontal arrangement and/or vertical arrangement of the image or images may be influenced by the way in which the holographic film layer has been manufactured.

The division of the amount of light into the different viewing directions or angular ranges may be effected uniformly or, alternatively, non-uniformly, for example, with a rising luminance in a certain trajectory so that the central images of the same object look bright and the outer images look darker to the viewer.

The division into the different viewing directions may be effected in accordance with the color (three or more). Due to the wavelength sensitivity of the "thick" holograms, a very good separation is possible. Principally, the image contents may be different in their individual colors.

The invention also relates to a projection device comprising at least one image projection apparatus, at least one transparent screen, wherein the transparent screen has at least one holographic film layer which is partially illuminated multiple times at different pick-up angles to the same object, so that the film layer has a plurality of hologram images of the same object at mutually different pick-up angles, and/or the transparent screen comprises a plurality of holographic film layers, in which each film layer is illuminated once at different pick-up angles to the same object, so that each film layer has one hologram image of the object at a different pick-up angle.

The projection system and the projection device according to the invention can be used advantageously for visualizing images and/or data, particularly commercials. In addition to the screen shown in FIGS. 1 and 2, the use of a reflective screen is also possible.

These and other aspects of the invention are apparent from and will be elucidated with reference to the embodiment described hereinafter.

Figure 2:
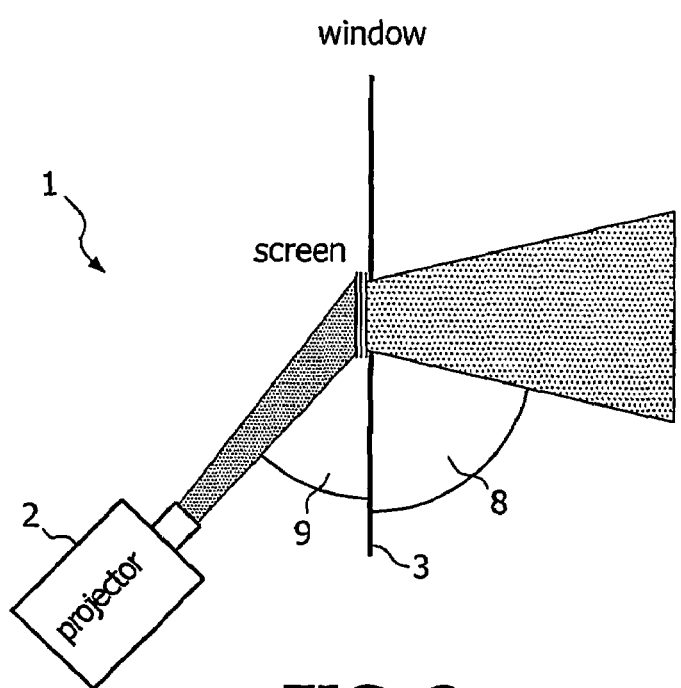

In the drawings:

FIG. 1 shows a projection system according to the invention, with three viewing directions in a plan view, FIG. 2 shows a projection system according to the invention, with the radiation in a vertical direction.

FIG. 1 shows a projection system 1 with an image projection apparatus 2, and a screen 3 with three holographic film layers, each film layer having the holographic image of the same object at a different pick-up angle, a radiation of beams with three viewing directions 4, 5, 6, with the screen 3 being arranged flush with the projected light cone 7 from the image projection apparatus 2. The images appear to the viewers, while the angular ranges of the three images of the same object visualized to the viewers extend from −50° to −30°, −10° to +10° and +30° to +50°. At the intermediate angles, no image appears and the screen 3 looks transparent and enables the viewer to see the configuration of windows (not shown) behind the screen.

FIG. 2 shows a projection system 1 with an image projection apparatus 2, and a screen 3 with three holographic film layers, each film layer having the holographic image of the same object at a different pick-up angle. The radiation of beams from the projection system 1, starting from the image projection apparatus 2, is shown in the vertical direction, with the exit angle 8 being different from the angle of incidence 9. In spite of a horizontal viewing direction, this allows mounting of the projector above or below a window (not shown). The vertical projection angle preferably ranges from −20° to +20°.

The invention claimed is:

1. A projection system comprising:
   at least one image projection apparatus,
   at least one transparent screen deflecting the light from the image projection apparatus into a plurality of discrete, mutually spaced directions so that a free area which is free from images is formed between identical images, and
   a plurality of projected, mutually spaced holographic frames of at least one image visualized by the transparent screen, wherein
   the transparent screen comprises at least one film layer which is partially illuminated multiple times at different pick-up angles to a same object of an image, so that the film layer has a plurality of hologram images of the same object at mutually different pick-up angles,
   wherein the transparent screen looks transparent to a viewer in the free area at angular ranges between adjacent frames, and wherein light intensity at the adjacent frames is a factor of 2 to 10 higher than the light intensity at the free area.

2. The projection system as claimed in claim 1, wherein the pick-up angles differ by at least ±1% and maximally ±60%.

3. The projection system as claimed in claim 1, wherein the images visualized at a mutual distance by the transparent screen are visible to the viewer within a viewing angle range with respect to the transparent screen of at least ±1% and maximally ±60%.

4. The projection system as claimed in claim 1, wherein mutually spaced, discrete images of the object picked up at different angles and visualized to the viewer by projection on at least one of a holographic reflective layer and a transmissive layer do not overlap.

5. The projection system as claimed in claim 1, wherein mutually spaced, discrete images of the object visualized by the transparent screen exhibit at least one of color and luminance differences to the viewer.

6. The projection system as claimed in claim 1, wherein the transparent screen comprises at least two holographic film layers.

7. The projection system as claimed in claim 1, wherein the mutually spaced, discrete images of the same object visualized by the transparent screen are different to the viewer as far as at least one of height, width, horizontal arrangement and vertical arrangement are concerned.

8. A projection device comprising
   at least one image projection apparatus,
   at least one transparent screen, wherein the transparent screen comprises at least one film layer which is partially illuminated multiple times at different pick-up angles to the same object, so that the film layer has a plurality of hologram images of the same object at mutually different pick-up angles, wherein the transparent screen looks transparent to a viewer in a tree area at angular ranges between adjacent frames, and wherein light intensity at the adjacent frames is a factor of 2 to 10 higher than the light intensity at the free area.

9. A projection device comprising:
   at least one image projection apparatus;
   at least one transparent screen;
   wherein the transparent screen comprises a plurality of holographic film layers, in which each film layer is illuminated once at different pick-up angles to the same object, so that each film layer has one hologram image of the object at a different pick-up angle, and
   wherein the transparent screen looks transparent to a viewer in a free area at angular ranges between adjacent frames, and wherein light intensity at the adjacent frames is a factor of 2 to 10 higher than the light intensity at the free area.

* * * * *